United States Patent
Lark et al.

(10) Patent No.: US 7,803,321 B2
(45) Date of Patent: Sep. 28, 2010

(54) FORMULATING CHEMICAL SOLUTIONS BASED ON VOLUMETRIC AND WEIGHT BASED CONTROL MEASUREMENTS

(75) Inventors: Larry Mitchell Lark, Saint Paul, MN (US); Darren Jahnke, Lonsdale, MN (US); Eric Willman, White Bear Lake, MN (US); Warren Pannkuk, Lakeville, MN (US)

(73) Assignee: Ecolab Inc., St. Paul, MN (US)

( * ) Notice: Subject to any disclaimer, the term of this patent is extended or adjusted under 35 U.S.C. 154(b) by 1143 days.

(21) Appl. No.: 11/084,645

(22) Filed: Mar. 18, 2005

(65) Prior Publication Data

US 2006/0210430 A1 Sep. 21, 2006

(51) Int. Cl.
G01N 21/00 (2006.01)
G05B 15/00 (2006.01)
G05B 21/00 (2006.01)
B67D 1/00 (2006.01)
G01N 1/00 (2006.01)

(52) U.S. Cl. .............. 422/62; 700/1; 700/17; 700/240; 700/266; 222/52; 436/174

(58) Field of Classification Search ............ 422/62, 422/905, 3; 222/77, 55, 52; 700/266, 700/17, 1, 240
See application file for complete search history.

(56) References Cited

U.S. PATENT DOCUMENTS 33,861 A 12/1861 Whitney 2,333,791 A 11/1943 Hutchinson, Jr.

(Continued)

FOREIGN PATENT DOCUMENTS

CA 1333099 11/1994

(Continued)

OTHER PUBLICATIONS http://www.cidex.com/products_&_services/aer/literature/index.asp, Advanced Sterlization Products; AER Brochure, Installation Requirements and Product Specifications.*

(Continued)

*Primary Examiner*—Jill Warden
*Assistant Examiner*—Neil Turk
(74) *Attorney, Agent, or Firm*—Shumaker & Sieffert, P.A.

(57) ABSTRACT

A system and method for formulating a chemical solution using both volumetric and weight based measurements of components of the chemical solution is disclosed. The components of the chemical solution include water and at least one other component, which may take any form, such as, without limitation, liquid, solid, powder or gaseous form. Formulation of the chemical solution is administered by combining water with the one or more other components at an output port, from which this combination is dispensed to a solution storage tank. In response to a user's request to formulate a specified amount of the chemical solution, the volume of water provided to the output port is monitored by a flow meter and the weight of the other component(s) provided to the output port is monitored by one or more load cells. Based on such monitoring, appropriate amounts of water and the other component(s) are combined together to formulate the specified amount of the chemical solution in the solution storage tank.

14 Claims, 8 Drawing Sheets

U.S. PATENT DOCUMENTS

| | | | |
|---|---|---|---|
| 3,412,254 A | 11/1968 | Meyer-Doering et al. | |
| 3,743,598 A | 7/1973 | Field | |
| 3,754,871 A | 8/1973 | Hessel et al. | |
| 3,760,166 A | 9/1973 | Adams et al. | |
| 3,772,193 A | 11/1973 | Nelli et al. | |
| 3,774,056 A | 11/1973 | Sample et al. | |
| 3,826,113 A | 7/1974 | Noraas et al. | |
| 4,040,515 A | 8/1977 | Hessel | |
| 4,046,996 A | 9/1977 | Williams et al. | |
| 4,211,517 A | 7/1980 | Schmid | |
| 4,241,400 A | 12/1980 | Kiefer | |
| 4,247,396 A | 1/1981 | Buesing | |
| 4,265,266 A | 5/1981 | Klerbow et al. | |
| 4,353,482 A * | 10/1982 | Tomlinson et al. | 222/1 |
| 4,396,828 A | 8/1983 | Dino et al. | |
| 4,402,426 A | 9/1983 | Faulkner et al. | |
| 4,404,639 A | 9/1983 | McGuire et al. | |
| 4,427,133 A * | 1/1984 | Kierbow et al. | 222/77 |
| 4,482,785 A | 11/1984 | Finnegan et al. | |
| 4,509,543 A | 4/1985 | Livingston et al. | |
| 4,573,606 A | 3/1986 | Lewis et al. | |
| 4,597,091 A | 6/1986 | Blake | |
| 4,630,654 A | 12/1986 | Kennedy, Jr. | |
| 4,676,399 A | 6/1987 | Burckhardt | |
| 4,690,305 A | 9/1987 | Copeland | |
| 4,697,243 A | 9/1987 | Moore et al. | |
| 4,707,848 A | 11/1987 | Durston et al. | |
| 4,711,370 A | 12/1987 | Goudy, Jr. et al. | |
| 4,756,321 A | 7/1988 | Livingston et al. | |
| 4,826,661 A | 5/1989 | Copeland et al. | |
| 4,837,811 A | 6/1989 | Butler et al. | |
| 4,845,965 A | 7/1989 | Copeland et al. | |
| 4,848,381 A | 7/1989 | Livingston et al. | |
| 4,858,449 A | 8/1989 | Lehn | |
| 4,867,196 A | 9/1989 | Zetena et al. | |
| 4,908,190 A | 3/1990 | Maglio et al. | |
| 4,964,185 A | 10/1990 | Lehn | |
| 4,976,137 A | 12/1990 | Decker et al. | |
| 4,980,292 A | 12/1990 | Elbert et al. | |
| 4,999,124 A | 3/1991 | Copeland | |
| 5,014,211 A | 5/1991 | Turner et al. | |
| 5,014,877 A | 5/1991 | Roos | |
| 5,036,479 A | 7/1991 | Prednis et al. | |
| 5,038,807 A | 8/1991 | Bailey et al. | |
| 5,043,860 A | 8/1991 | Koether et al. | |
| 5,053,206 A | 10/1991 | Maglio et al. | |
| 5,064,094 A | 11/1991 | Roos et al. | |
| 5,136,281 A | 8/1992 | Bonaquist | |
| 5,147,615 A | 9/1992 | Bird et al. | |
| 5,203,366 A | 4/1993 | Czeck et al. | |
| 5,219,224 A | 6/1993 | Pratt | |
| 5,222,027 A | 6/1993 | Williams et al. | |
| 5,240,326 A | 8/1993 | Evanson | |
| 5,268,153 A | 12/1993 | Muller | |
| 5,279,448 A | 1/1994 | Hanlin et al. | |
| 5,283,639 A | 2/1994 | Esch et al. | |
| 5,322,571 A | 6/1994 | Plummer et al. | |
| 5,332,312 A | 7/1994 | Evanson | |
| 5,345,379 A | 9/1994 | Brous et al. | |
| 5,370,267 A | 12/1994 | Schroeder | |
| 5,389,344 A | 2/1995 | Copeland et al. | |
| 5,397,028 A | 3/1995 | Jesadanont | |
| 5,400,018 A | 3/1995 | Scholl et al. | |
| 5,404,893 A | 4/1995 | Brady et al. | |
| 5,411,716 A | 5/1995 | Thomas et al. | |
| 5,423,457 A * | 6/1995 | Nicholas et al. | 222/62 |
| 5,427,748 A | 6/1995 | Wiedrich et al. | |
| 5,497,914 A | 3/1996 | Maltsis | |
| 5,500,050 A | 3/1996 | Chan | |
| 5,505,915 A | 4/1996 | Copeland et al. | |
| 5,556,478 A | 9/1996 | Brady et al. | |
| 5,580,448 A | 12/1996 | Brandreth | |
| 5,584,025 A | 12/1996 | Keithley et al. | |
| 5,584,079 A | 12/1996 | Wong et al. | |
| 5,609,417 A | 3/1997 | Otte | |
| 5,619,183 A | 4/1997 | Ziegra et al. | |
| 5,625,659 A | 4/1997 | Sears | |
| 5,625,908 A | 5/1997 | Shaw | |
| 5,636,008 A | 6/1997 | LoBiondo et al. | |
| 5,638,417 A | 6/1997 | Boyer et al. | |
| 5,671,262 A | 9/1997 | Boyer et al. | |
| 5,679,173 A | 10/1997 | Hartman | |
| 5,681,400 A | 10/1997 | Brady et al. | |
| 5,694,323 A | 12/1997 | Koropitzer et al. | |
| 5,695,091 A | 12/1997 | Winings et al. | |
| 5,724,261 A | 3/1998 | Denny et al. | |
| 5,745,381 A | 4/1998 | Tanaka et al. | |
| 5,757,664 A | 5/1998 | Rogers et al. | |
| 5,758,300 A | 5/1998 | Abe | |
| 5,761,278 A | 6/1998 | Pickett et al. | |
| 5,762,096 A | 6/1998 | Mirabile | |
| 5,769,536 A | 6/1998 | Kotylak | |
| 5,777,895 A | 7/1998 | Kuroda et al. | |
| 5,821,523 A | 10/1998 | Bunte et al. | |
| 5,826,749 A | 10/1998 | Howland et al. | |
| 5,827,486 A | 10/1998 | Crossdale | |
| 5,839,097 A | 11/1998 | Klausner | |
| 5,851,291 A | 12/1998 | Poterala et al. | |
| 5,861,881 A | 1/1999 | Freeman et al. | |
| 5,864,783 A | 1/1999 | Struck et al. | |
| 5,875,430 A | 2/1999 | Koether | |
| 5,885,446 A | 3/1999 | McGrew, Jr. | |
| 5,887,975 A | 3/1999 | Mordaunt et al. | |
| 5,897,671 A | 4/1999 | Newman et al. | |
| 5,902,749 A | 5/1999 | Lichtwardt et al. | |
| 5,931,877 A | 8/1999 | Smith et al. | |
| 5,933,479 A | 8/1999 | Michael et al. | |
| 5,939,974 A | 8/1999 | Heagle et al. | |
| 5,945,910 A | 8/1999 | Gorra | |
| 5,956,487 A | 9/1999 | Venkatraman et al. | |
| 5,961,561 A | 10/1999 | Wakefield, II | |
| 5,967,202 A | 10/1999 | Mullen et al. | |
| 5,973,696 A | 10/1999 | Agranat et al. | |
| 5,974,345 A | 10/1999 | Buck et al. | |
| 5,975,352 A | 11/1999 | Spriggs et al. | |
| 5,980,090 A | 11/1999 | Royal et al. | |
| 6,003,070 A | 12/1999 | Frantz | |
| 6,029,286 A | 2/2000 | Funk | |
| 6,036,353 A | 3/2000 | Paetzold | |
| 6,049,792 A | 4/2000 | Hart et al. | |
| 6,061,668 A | 5/2000 | Sharrow | |
| 6,073,124 A | 6/2000 | Krishnan et al. | |
| 6,082,149 A | 7/2000 | Woods | |
| 6,098,843 A | 8/2000 | Soberanis et al. | |
| 6,120,175 A | 9/2000 | Tewell | |
| 6,129,449 A | 10/2000 | McCain et al. | |
| 6,133,555 A | 10/2000 | Brenn | |
| 6,136,184 A | 10/2000 | King | |
| 6,167,358 A | 12/2000 | Othmer et al. | |
| 6,220,312 B1 | 4/2001 | Hirsch et al. | |
| 6,321,204 B1 | 11/2001 | Kazami et al. | |
| 6,330,499 B1 | 12/2001 | Chou et al. | |
| 6,356,205 B1 | 3/2002 | Salvo et al. | |
| 6,357,292 B1 | 3/2002 | Schultz et al. | |
| 6,370,454 B1 | 4/2002 | Moore | |
| 6,377,868 B1 | 4/2002 | Gardner, Jr. | |
| 6,418,371 B1 | 7/2002 | Arnold | |
| 6,438,471 B1 | 8/2002 | Katagishi et al. | |
| 6,463,940 B1 | 10/2002 | Thomas et al. | |
| 6,490,513 B1 | 12/2002 | Fish et al. | |
| 6,547,097 B1 | 4/2003 | Cavallaro et al. | |
| 6,585,934 B1 | 7/2003 | Oberleitner et al. | |
| 6,697,706 B2 | 2/2004 | Gardner, Jr. | |
| 6,707,873 B2 | 3/2004 | Thompson et al. | |

| | | | |
|---|---|---|---|
| 6,763,860 B2 | 7/2004 | Jungmann et al. | |
| 2001/0039501 A1 | 11/2001 | Crevel et al. | |
| 2001/0047214 A1 | 11/2001 | Cocking et al. | |
| 2001/0053939 A1 | 12/2001 | Crevel et al. | |
| 2001/0054038 A1 | 12/2001 | Crevel et al. | |
| 2002/0014496 A1 | 2/2002 | Cline et al. | |
| 2003/0033156 A1 | 2/2003 | McCall | |
| 2003/0033396 A1 | 2/2003 | McCall | |
| 2003/0043688 A1 | 3/2003 | Peterson et al. | |
| 2003/0195656 A1 | 10/2003 | Gardner, Jr. et al. | |
| 2004/0015269 A1 | 1/2004 | Jungmann et al. | |
| 2004/0088076 A1 | 5/2004 | Gardner, Jr. | |
| 2004/0162850 A1 | 8/2004 | Sanville et al. | |
| 2004/0220844 A1 | 11/2004 | Sanville et al. | |
| 2004/0226959 A1 | 11/2004 | Mehus et al. | |
| 2004/0226961 A1 | 11/2004 | Mehus et al. | |
| 2004/0230339 A1 | 11/2004 | Maser et al. | |
| 2005/0065644 A1 | 3/2005 | Gardner, Jr. | |
| 2005/0072793 A1 | 4/2005 | Mehus et al. | |
| 2005/0102059 A1 | 5/2005 | Gardner, Jr. | |

FOREIGN PATENT DOCUMENTS

| | | | |
|---|---|---|---|
| DE | 2444199 | | 3/1975 |
| DE | 19633713 | | 2/1988 |
| DE | 283081 | | 10/1990 |
| DE | 4025624 | | 2/1991 |
| DE | 19540608 | | 5/1997 |
| DE | 19757679 | | 7/1998 |
| DE | 19736982 | | 8/1998 |
| EP | 59695 | | 9/1982 |
| EP | 269435 | | 6/1988 |
| EP | 0882496 | A2 | 12/1998 |
| EP | 0995483 | A1 | 4/2000 |
| FR | 2 743 509 | | 7/1997 |
| GB | 2 031 748 | | 4/1980 |
| GB | 2052251 | | 5/1980 |
| HU | 41652 | | 5/1987 |
| JP | 56076233 | | 6/1981 |
| JP | 09032084 | | 2/1997 |
| JP | 09032085 | | 2/1997 |
| JP | 09041466 | | 2/1997 |
| JP | 09057081 | | 3/1997 |
| JP | 09195364 | | 7/1997 |
| JP | 09277913 | | 10/1997 |
| JP | 10124746 | | 5/1998 |
| JP | 11286980 | | 10/1999 |
| JP | 11299671 | | 11/1999 |
| JP | 11330041 | | 11/1999 |
| SU | 1691219 | | 11/1991 |
| WO | WO 8302761 | | 8/1983 |
| WO | WO 9315828 | | 8/1993 |
| WO | WO 9739327 | | 10/1997 |
| WO | WO 9809598 | | 3/1998 |
| WO | WO 9826704 | | 6/1998 |
| WO | WO 9842786 | | 10/1998 |
| WO | WO 0037770 | | 6/2000 |
| WO | WO 0053346 | | 9/2000 |
| WO | WO 03/059143 | | 7/2003 |
| WO | 2005/044437 | | 5/2005 |

OTHER PUBLICATIONS

Chan, Xiaolan, A Comparison of the Useful Life of CIDEX Activated Dialdehyde Solution and CIDEX OPA Solution in AER System; Advanced Sterilization Products, Copyright 1999.*
International Search Report and Written Opinion, from corresponding PCT Application Serial No. PCT/US2006/003943, mailed Jun. 6, 2006, 12 pages.
U.S. Appl. No. 10/956,942, Gardner, Jr. et al.
U.S. Appl. No. 10/696,013, Gardner, Jr. et al.
U.S. Appl. No. 10/427,032, Sanville et al.
U.S. Appl. No. 10/369,821, Sanville et al.
U.S. Appl. No. 11/020,713, Gardner, Jr. et al.
Presentation, "ECOLAB Aramark Uniform Services Joining Forces for Service Excellence".
T-Jet 2000 PC "Wash Aisle Productivity Manager Software Guide", ECOLAB Textile Care Division, 28584/4001/0399 (9207-4327).
Sample Reports consisting of 10 pages.
Sample Reports, Novalink System, 96-04620-00A, consisting of 8 pages.
Nova Controls, Nova News, "Save Money and Gain Sales Features?".
Novalink Overview Program Pricing.
Orion Liquid Laundry Supply Dispenser.
Novalink Laundry Information System, "ControlMaster Version 2.0 for Windows User's Guide".
PerSyst Inc. "LDAS-2000 Remote Information Control and Management System for the Commercial Laundry And Vending Industry".
PerSyst Inc. Dial A-Wash Automatic Laundry Room Attendant for Apartment and Complex Laundry Rooms.
iNtOUCH Water Treatment Information Management Solution Statement of Work Presented to: ECOLAB (draft form), Mar. 29, 1999.
Brochure, Novalink, "The Laundry Information System" from Nova Controls.
Diverlog-L Enhanced "DLE—Production Summary Reports", Diversey.
Diverlog-L Enhanced "DLE—Set-up Report", Diversey.
Diverlog-L Enhanced "DLE—Single Cycle Reports", Diversey.
CLAX Diverflow System Advanced Central Dosing Technology For Laundries Sep. 10, 1999.
*We'd like to make a couple of things perfectly CLEAR*, Aquabalance Pool and Spa Management, Ecolab brochure, 1998 Ecolab Inc.
*White Paper*, ECOLAB BALANCER. COM, MRE Jun. 4, 1997.
*Relax. We've Got Your Pool Concerns Under Control*, Ecolab Water Care Services, 1998 Ecolab, Inc.

* cited by examiner

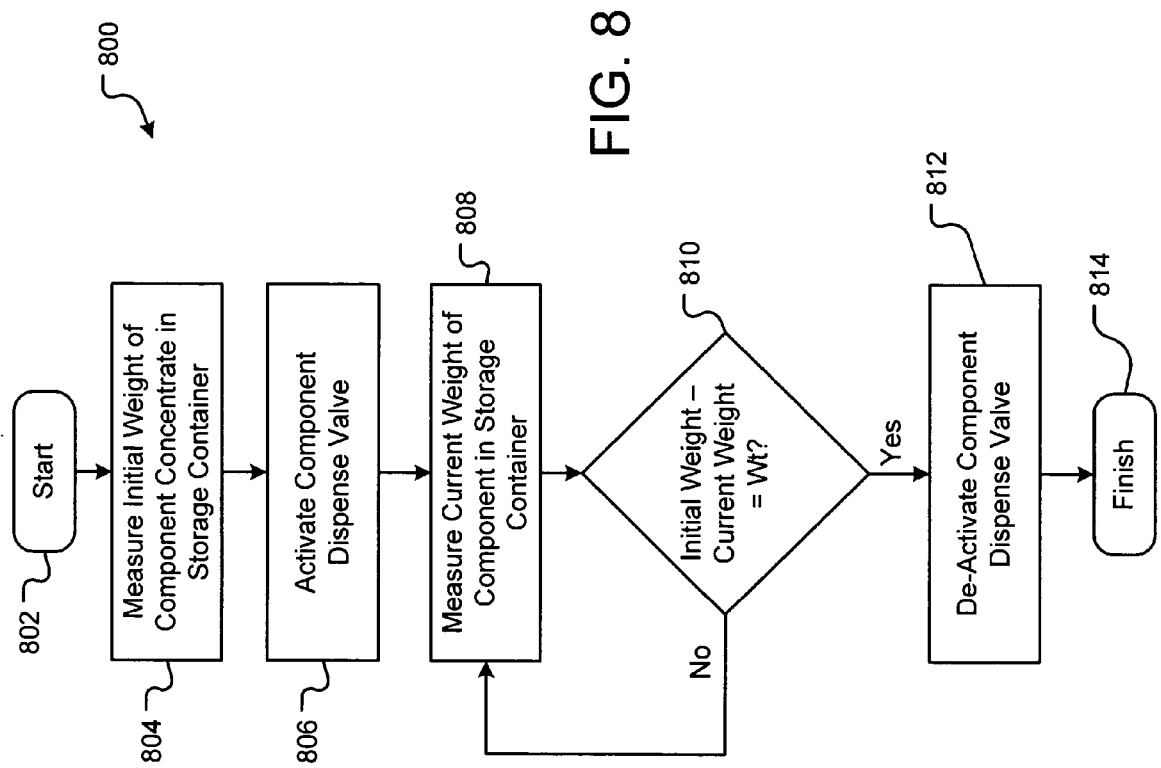

FORMULATING CHEMICAL SOLUTIONS BASED ON VOLUMETRIC AND WEIGHT BASED CONTROL MEASUREMENTS

TECHNICAL FIELD

The invention relates generally to chemical solution dispense systems, and more particularly, to formulating chemical solutions using both volumetric and weight based measurements of components of the chemical solutions.

BACKGROUND

Conventional endoscope reprocessing involves either one of two manual cleaning approaches. In a first approach, a pre-formulated chemical solution is manually poured into an automatic endoscope reprocessor (AER), which is then used to dispense the pre-formulated chemical solution onto the endoscope for cleaning. While such pre-formulated chemical solutions require very little attention, i.e., just pour and go, the use of these pre-formulated chemicals, while generally accepted, have drawbacks. First, these pre-formulated chemical solutions have been proven in years' past to fail to clean endoscopes at a level sufficient to meet standards. Secondly, pre-formulated chemical solutions are typically more expensive than chemicals that require on-site mixing. Finally, and on the other end of the spectrum, these pre-formulated chemical solutions typically have a rather large toxicity, and therefore are dangerous to endoscope reprocessing technicians and possibly even patients.

In view of these shortfalls, a "mix on site" approach to formulating chemical solutions for use in endoscope reprocessing has surfaced and actually proven quite effective not only for meeting health standards, but also with respect to cost. In this approach, a service technician performing the reprocessing will manually mix one or more component concentrates with water in order to formulate a chemical solution on site. Then, the technician pours the formulated chemical solution in an AER for application to the subject endoscopes for reprocessing. While this new approach has obvious advantages over the use of pre-formulated chemical solutions, it does have drawbacks. First, being a manual process, this approach is therefore extremely time consuming. This is especially true if the technician is responsible for reprocessing numerous endoscopes. Secondly, the mixture of many of the component concentrates used to formulate chemical solutions for endoscope reprocessing yields a quite unpleasant and potentially harmful odor, which obviously can have adverse effects on the servicing technicians.

SUMMARY OF THE INVENTION

In accordance with the present invention, the above and other problems are solved by a system for formulating a chemical solution by combining water with a component concentrate. The system includes a storage tank for storing the component concentrate. The system also includes an output port for receiving the water from a water source and for receiving the component concentrate from the storage tank. The water and the component concentrate are collectively dispensed from the output port to a solution container for forming the chemical solution therein.

In accordance with an embodiment, the system also includes a flow meter and a weight measuring device. The flow meter measures volumetric readings representing a volume of the water communicated between the water source and the output port. The weight measuring device measures weight readings representing an actual weight of the at least one component concentrate contained in the storage tank. In an embodiment, the storage tank may be a sump to which the component concentrate is supplied from a concentrate container prior to being dispensed to the output port. Alternatively, the storage tank may be a concentrate container from which the component concentrate is pulled directly for supply to the output port. The system also includes a controller that controls supply of the water and the component concentrate to the output port based on the volumetric readings and the weight readings to form a specified amount of the chemical solution.

In accordance with an embodiment, the system also includes a pump fluidly connected between the storage tank and the concentrate container. The pump is controllable by the controller to pump the component concentrate from the concentrate container to the storage tank. Additionally, the system may also include a control valve that is fluidly connected between the storage tank and the output port. The control valve is controllable by the controller to enable the flow of the at least component concentrate between the component sump and the output port.

In accordance with another embodiment of the present invention, the invention is embodied in a method for formulating a chemical solution by combining water with one or more component concentrates. The method involves supplying the water and the component concentrate to a solution container in which the chemical solution is being formed. Prior to being supplied to the solution container, the component concentrate is stored in a storage tank. The method also involves measuring volumetric readings representing a volume of the water being supplied from the water source to the solution container prior to the water being introduced into the solution container. Even further, the method measures weight readings representing an actual weight of the component concentrate remaining in the storage tank while the component concentrate is being supplied to the solution container. Based on these volumetric and weight readings, the method controls the supply of the water and the component concentrate to the solution tank in order to form a specified amount of the chemical solution therein.

The invention may be implemented as a computer process, a computing system or as an article of manufacture such as a solid state, non-volatile memory device or a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIG. 8 is a flow diagram that illustrates operational characteristics embodying the concentrate supply operation shown in FIG. 5 in more detail in accordance with an embodiment of the present invention depicted in FIG. 2.

DETAILED DESCRIPTION

Figure 1:
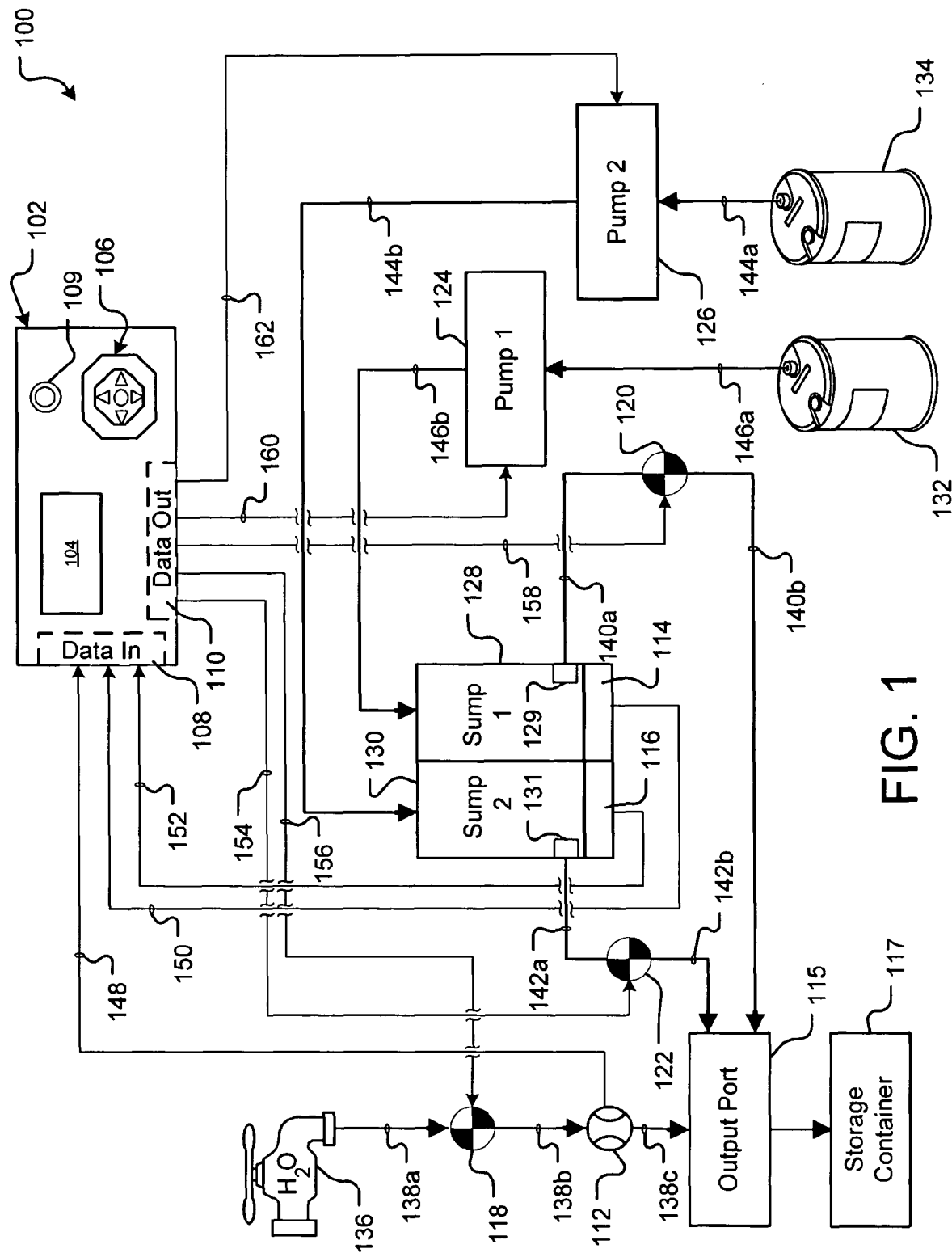
FIG. 1 is a functional diagram of a system for formulating chemical solutions in accordance with an embodiment of the present invention.

The present invention and its various embodiments are described in detail below with reference to the accompanying figures. When referring to the figures, like structures and elements shown throughout are indicated with like reference numerals.

In general, the present invention relates to formulating chemical solutions using both volumetric and weight based measurements of components of the chemical solutions. The components of the chemical solution may take any form, such as, without limitation, liquid, solid, powder or gaseous form. However, for illustration purposes only, the present invention is described in connection with the accompanying figures as being in liquid form, wherein at least one component is water and at least one other component is a liquid chemical concentrate. While all components are illustratively described in liquid form, it should be appreciated that different components of a single chemical solution may instead take differing forms. For example, a liquid, powder, gaseous or solid concentrate may be combined with any one or more of another liquid, powder, gaseous or solid concentrate to form a single chemical solution in accordance with various embodiments of the present invention.

Referring now to FIG. 1, a formulation system 100 is shown in functional diagram form in accordance with an embodiment of the present invention. For nomenclature purposes, this particular system is referred to as a "batch processing" formulation system. This batch processing formulation system 100 includes, without limitation, a controller 102, one or more component sumps (e.g., 128 and 130), which is a form of storage tank, each component sump (e.g., 128 and 130) having an associated weight measuring device (e.g., 114 and 116), one or more concentrate pumps (e.g., 124 and 126), each concentrate pump (e.g., 124 and 126) being fluidly coupled to a concentrate storage container (e.g., 132 and 134), which also is a form of storage tank, a plurality of control valves (e.g., 118, 120 and 122), a flow meter 112, a water source 136 and various data communication lines (148, 150, 152, 154, 156, 158, 160 and 162) and component communication lines (e.g., 138a, 138b, 138c, 140a, 140b, 142a, 142b, 144a, 144b, 146a and 146b), each of which are described in detail below.

The controller 102 includes a display 104 and a user interface selection device 106. A graphical user interface is presented to a user of the formulation system 100 through the display 104 and the user interacts with the graphical user interface by way of inputting commands into the user interface selection device 106. For example, the user interface selection device 106 may be used by the user to instruct the controller 102 to formulate a specific amount of a specific chemical solution. In response to such an instruction, the controller 102 administers operation of the formulation system 100 to formulate a requested chemical solution in "ready to use" fashion. In an embodiment, the chemical solution is formed in a solution storage container 117, such as an AER, which may thereafter be transported to a point of use. Alternatively, the solution storage container 117 may be removed from the formulation system 100 and used to dispense the chemical solution to a point of use situated in close proximity to the output port 115.

While the user interface selection device 106 is shown generally as a button-based device, this device 106 may take the form of any user input selection device known to those skilled in the art. For example, the user interface selection device 106 may embody a joystick, mouse, keyboard, mouse pad, stylus or a combination of any of these conventional input mechanisms. Additionally, the user interface selection device 106 may be integrated with the display 104 to render a touch screen interface thereon. Even further, the user interface selection device 106 may be replaced or supplemented with a wireless communication port 109 through which a user may input instructions to and receive information from a laptop computer, a personal digital assistant (PDA) or the like.

The controller 102 also includes a data input bank 108 and a data output bank 110. The data input bank 108 provides the controller 102 with a data input module for receiving data from the various "monitoring" components of the formulation system 100, such as, the flow meter 112 and the plurality of weight measuring devices 114 and 116. The data received by the controller 102 at the data input bank 108 is used by the controller 102 to control operation of the plurality of control valves 118, 120 and 122 as well as the plurality of concentrate pumps 124 and 126, as described in greater detail below. To accomplish such control, the data output bank 110 serves as an output module for use by the controller 102 in issuing commands to the control valves 118, 120 and 122 as well as the concentrate pumps 124 and 126 via data communication lines 154, 156, 158, 160 and 162.

The formulation system 100 includes one or more concentrate storage containers, such as a first concentrate storage container 132 and a second concentrate storage container 134 shown in FIG. 1 in accordance with an exemplary embodiment of the present invention. Both the first concentrate storage container 132 and the second concentrate storage container 134 contain a component concentrate for use in formulating chemical solutions in accordance with instructions issued by the controller 102. In an embodiment, the formulation system 100 is operable to formulate various chemical solutions using a variety of different component concentrates. In this regard, the first concentrate storage container 132 and the second concentrate storage container 134 are operable to store various types of component concentrates. Additionally, the formulation system 100 may include any number of concentrate storage containers (e.g., 132 and 134) sufficient to accommodate for all possible component concentrates required to formulate each of the different types of chemical solutions that the formulation system 100 is operable to formulate.

In accordance with an embodiment shown in FIG. 1, the formulation system 100 includes a concentrate pump (e.g., 124 and 126), a component sump (e.g., 128 and 130) and a control valve (e.g., 120 and 122) for each concentrate storage container (e.g., 132 and 134) included in the system 100. In an alternative embodiment, the system 100 may instead be configured with a single weight measuring device (e.g., 114, 116) for both concentrate sumps 128 and 130. Thus, the present invention is not limited to any specific number of weight measuring devices (e.g., 114, 116) for use with any specific number of concentrate sumps (e.g., 128 and 130).

The first concentrate container 132 is fluidly coupled to a first concentrate pump 124 by way of a container-pump section 146a of a first component supply line 146. Likewise, the second concentrate container 134 is fluidly coupled to a second concentrate pump 126 by way of a container-pump section 144a of a second component supply line 144. The first concentrate pump 124 is fluidly coupled to a first component sump 128 by way of a pump-sump section 146b of the first component supply line 146. Likewise, the second concentrate pump 126 is fluidly coupled to a second component sump 130 by way of a pump-sump section 144b of the second component supply line 144.

The first (124) and second (126) concentrate pumps are controllable by the controller 102 to selectively enable and disable the flow of component concentrates from the associated concentrate storage containers 132 and 134 to the respective component sumps 128 and 130. To accomplish such control, the data output bank 110 of the controller 102 is communicatively coupled to the first concentrate pump 124 by way of a first controller-pump data communication line 160. Likewise, the data output bank 110 of the controller 102 is communicatively coupled to the second concentrate pump 126 by way of a second controller-pump data communication line 162. In an alternative embodiment, one or more of the concentrate pumps 124 and 126 may be replaced by a controllable valve that opens and closes to regulate the flow of concentrate from the concentrate containers 132 and 134 to the respective component sumps 128 and 130. In this embodiment, the controllable valves are still controlled by the controller 102 by way of communication lines 160 and 162 and the first and second concentrates are provided to the sumps 128 and 130, respectively, by way of gravity or evacuation (e.g., aspirator) when the respective valves are open.

Each of the component sumps 128 and 130 contain an output 129 and 131, respectively, for dispensing component concentrate from the sumps 128 and 130. The output 129 of the first component sump 128 is fluidly coupled to a first component control valve 120 by way of a sump-valve section 140 of a first component output line 140. Likewise, the output 131 of the second component sump 130 is fluidly coupled to a second component control valve 122 by way of a sump-valve section 142a of a second component output line 142.

The first (120) and second (122) component control valves are controllable by the controller 102 to selectively enable and disable the flow of component concentrate from the associated sump 128 or 130, respectively, to an output port 115 of the formulation system 100. To accomplish this, the first component control valve 120 is communicatively coupled to the data output bank 110 of the controller 102 by way of a first controller-valve data communication line 158. Likewise, the second component control valve 122 is communicatively coupled to the data output bank 110 of the controller 102 by way of a second controller-valve data communication line 154. Thus, the controller 102 issues instructions to the first (120) and second (122) component control valves that effectively either "open" or "close" these valves 120 and 122 such that component concentrate stored in the first (128) and second (130) component sumps, respectively, may be provided to the output port 115 under direction of the controller 102. In an alternative embodiment, the control valves 120 and 122 are "flow control" valves that throttle (as opposed to pulsing the control valves open and closed) the flow of concentrates from the first (128) and second (130) component sumps.

In an embodiment, the component concentrates combine with water at the output port 115 and are collectively dispensed to the solution storage container 117 to form a requested chemical solution therein. The water is provided by a water source 136 to a water control valve 118 that is controllable by the controller 102 to enable and disable the flow of water to the output port 115. To accomplish this, the water control valve 118 is communicatively coupled to the data output bank 110 of the controller 102 by way of a third controller-valve data communication line 156.

In accordance with an embodiment, the output port 115 pulls the component concentrates from the first (128) and second (130) component sumps based on evacuation principles when the first (120) and second (122) component control valves are open, respectively. For example, the output port 115 may be a conventional aspirator that evaporates the first component sump 128 and/or the second component sump 130 when both the water control valve 118 is "open" and one or both of the first component control valve 120 and/or the second component control valve 122 is/are "open." Alternatively, the component concentrates from the first (128) and second (130) component sumps may be provided to the output port 115 based on gravity-based or pump-driven principles when the first (120) and second (122) component control valves are open, respectively. The actual implementation of the output port 115 is a matter of choice, and thus, any such implementation may be practiced and is contemplated within the scope of the present invention.

In addition to these "controllable" components described above, the formulation system 100 also include various the following "monitoring" components that provide information to the controller 102: a first weight measuring device 114, a second weight measuring device 116 and a flow meter 112. The first weight measuring device 114 is associated with the first component sump 128 and is used to measure the amount of component concentrate residing in the first component sump 128. Similarly, the second weight measuring device 116 is associated with the second component sump 130 and is used to measure the amount of component concentrate residing in the second component sump 130. In an embodiment, the weight measuring devices 116 are load cells; however, other weight measuring devices are contemplated within the scope of the present invention.

The flow meter 112 is fluidly coupled between the water control valve 118 and the output port 115 and monitors the flow of water therebetween. Specifically, the flow meter 112 measures volumetric information and provides this information to the data input bank 108 of the controller 102 via a first data input line 148. The weight measurements taken by the first weight measuring device 114 and the second weight measuring device 116 are provided to the data input bank 108 of the controller 102 by way of a second data input line 150 and a third data input line 152, respectively. With this information from the flow meter 112 and the weight measuring devices 114 and 116, the controller 102 monitors formulation of requested chemical solutions and controls the formulation system 100 accordingly.

Figure 2:
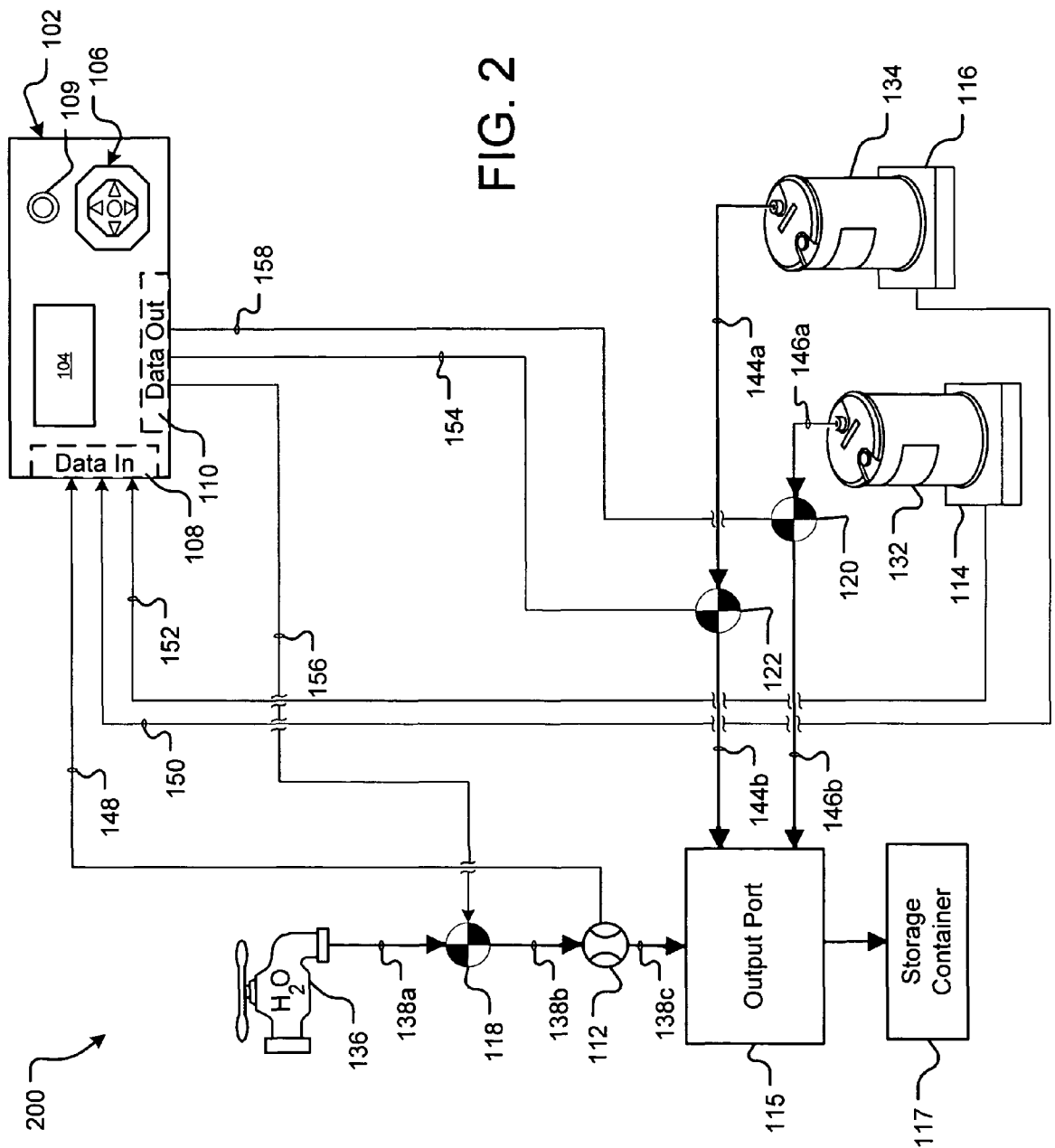
FIG. 2 is a functional diagram of a system for formulating chemical solutions in accordance with another embodiment of the present invention.

Turning now to FIG. 2, a formulation system 200 is shown in accordance with another embodiment of the present invention. For nomenclature purposes only, this formulation system 200 is referred to as a "proportional processing" formulation system. In the proportional formulation system 200, the first weight measuring device 114 and the second weight measuring device 116 directly measure weight of the component concentrates remaining in the first concentrate storage container 132 and the second concentrate storage container 134, respectively. These direct weight measurements are analyzed by the controller 102 to determine the amount of component concentrates pulled from each of the first concentrate storage container 132 and the second concentrate storage container 134 during formulation of a chemical solution. Based on these analyses, the controller 102 activates and de-activates the first and second component control valves 120 and 122, thereby controlling (i.e., enabling and disabling) the flow of component concentrates from the first (132) and second (134) storage containers to the output port 115 during chemical solution formulation. As described with reference to FIG. 1, the control valves 120 and 122 may be "flow control" valves that throttle (as opposed to pulsing a control valve open and closed) the flow of concentrates from the concentrate storage containers 132 and 134 according to an embodiment of the present invention.

Figure 3:
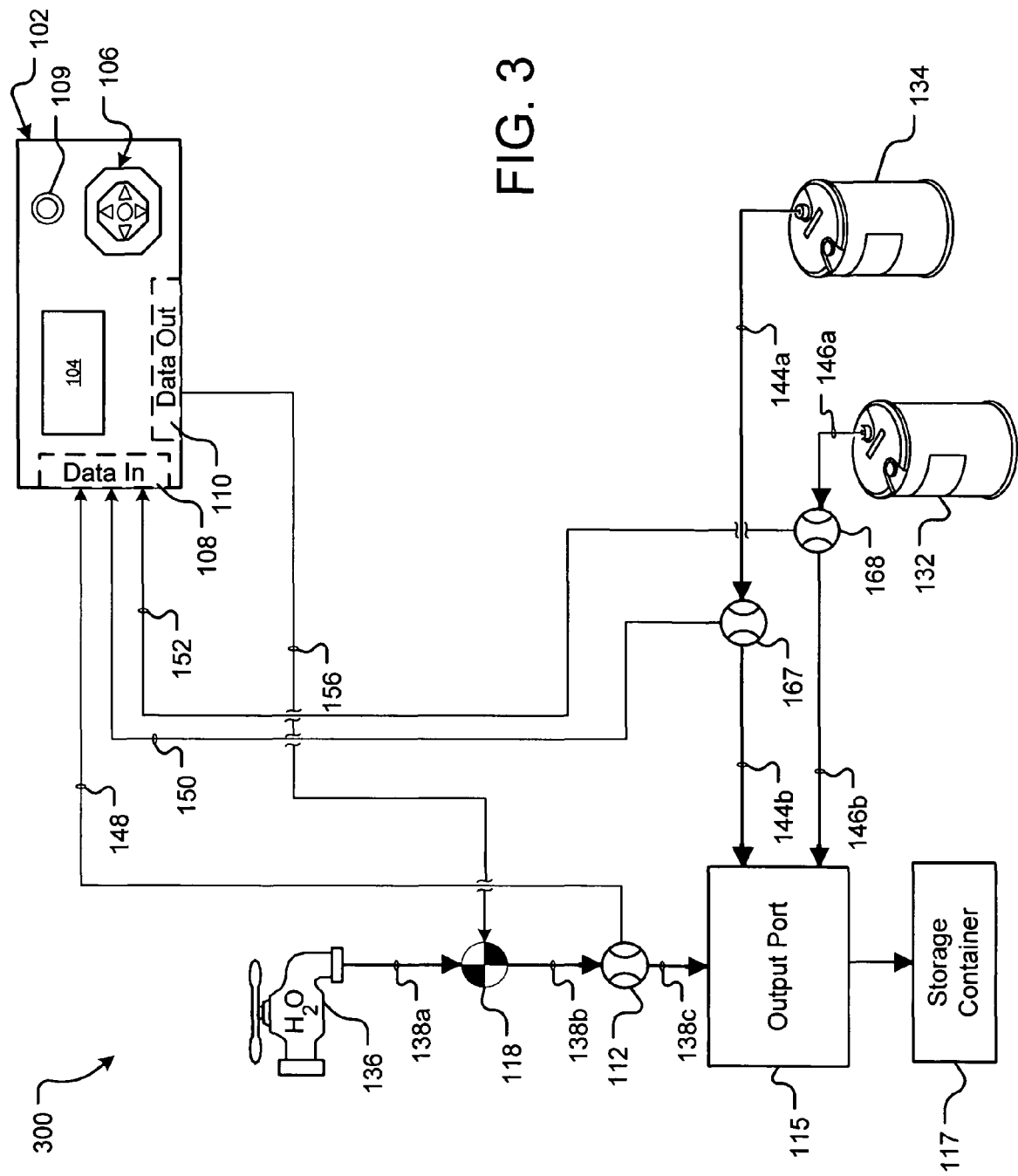
FIG. 3 is a functional diagram of a system for formulating chemical solutions in accordance with yet another embodiment of the present invention.

FIG. 3 illustrates a formulation system 300 in accordance with yet another embodiment of the present invention. In this formulation system 300, the first concentrate storage container 132 and the second concentrate storage container 134 each store a pre-measured weight of the first component concentrate and the second component concentrate, as required for formulation of a predetermined amount of a chemical solution. Because these containers 132 and 134 store the pre-measured weights of component concentrates, the weight measuring devices 114 and 116 are not necessary for use within this formulation system 300. In operation, the output port 115 pulls the component concentrates from the first (128) and second (130) component concentrate containers 132 and 134 based on evacuation principles in response to water flowing through the output port 115.

The formulation system 300 optionally includes flow meters 167 and 168 that separate each of the component communication lines 144 and 146 into two sections (144a and 144b) and (146a and 146b), respectively. The flow meters 167 and 168 measure the volumetric flow of component concentrates from the concentrate containers 132 and 134 and communicate these volumetric measurements to the controller 102, which in turn, monitors whether the appropriate volume of each component concentrate is provided to the output port 115. By using the flow meters 167 and 168, the pre-measured weight of the component concentrates may or may not amount to the volume of component concentrates required for formulation of the predetermined amount of the chemical solution. That is, the use of the flow meters 167 and 168 allows the component concentrates in the concentrate containers 132 and 134 to be used for multiple formulation processes. In an embodiment, the flow meters 167 and 168 may be replaced by flow sensors that, rather than measuring volumentric flow of component concentrates from the concentrate containers 132 and 134, simply detect whether flow is present and communicate this information to the controller 102.

Additionally, the component communication lines 144 and 146 may optionally include a valve (not shown), which is controllable by the controller 102 to enable the flow of component concentrates from the containers 132 and 134 during evacuation by the output port 115. Additionally, if the output port 115 does not function to evacuate the concentrate containers 132 and 134, the component concentrates may be provided to the output port 115 by gravity (if controllable valves are "open"), or alternatively, by pumps.

Figure 4:
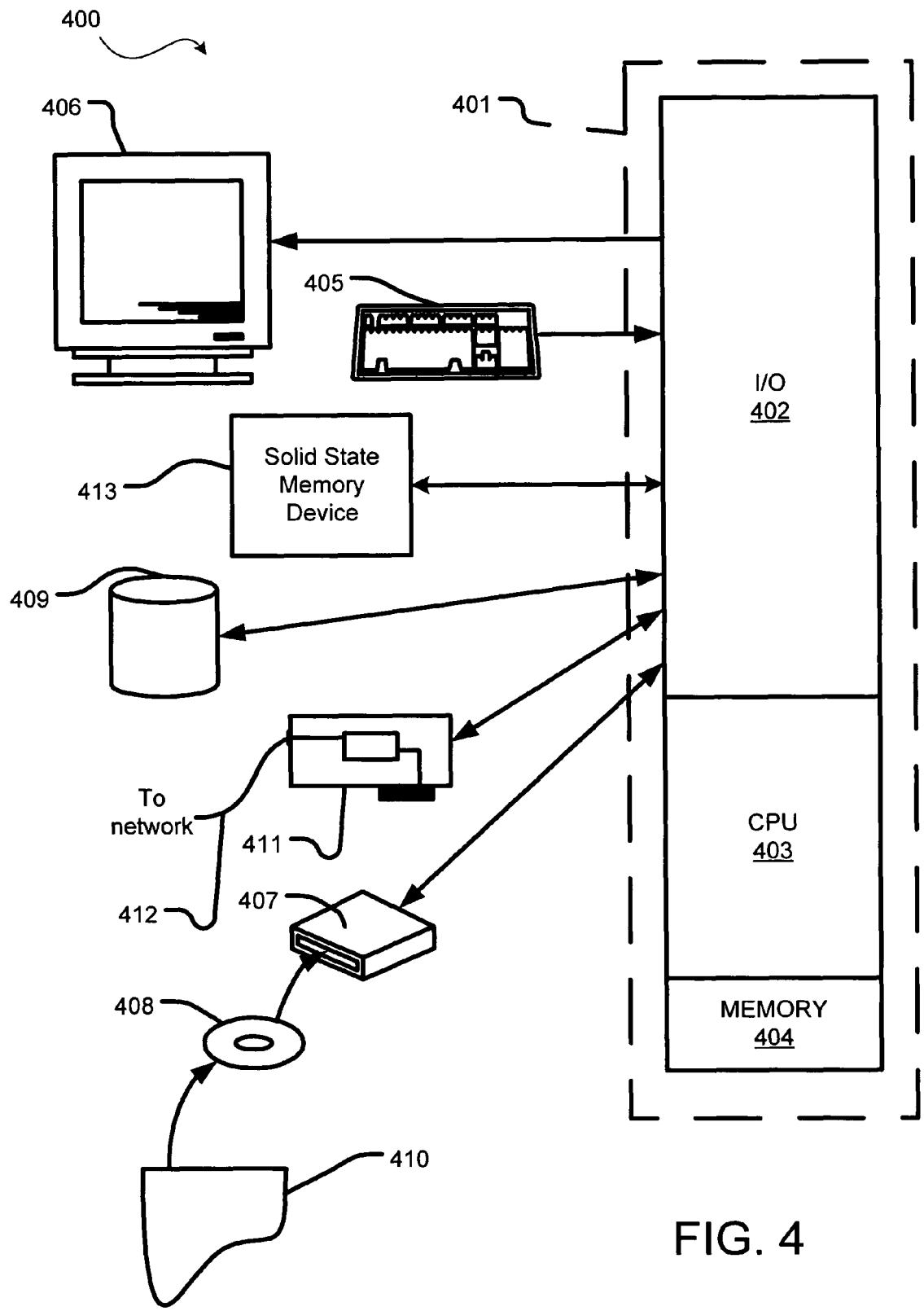
FIG. 4 depicts a block diagram of a suitable computing environment in which an embodiment of the present invention may be implemented.

FIG. 4 depicts a computing system 400 capable of executing a program product embodiment of the present invention. One operating environment in which the present invention is potentially useful encompasses the computing system 400, such as, for example, the controller 102 or a remote computer to which information collected by the controller 102 may be uploaded. In such a system, data and program files may be input to the computing system 400, which reads the files and executes the programs therein. Some of the elements of a computing system 400 are shown in FIG. 4 wherein a controller, illustrated as a processor 401, is shown having an input/output (I/O) section 402, a microprocessor, or Central Processing Unit (CPU) 403, and a memory section 404. The present invention is optionally implemented in software or firmware modules loaded in memory 404 and/or stored on a solid state, non-volatile memory device 413, a configured CD-ROM 408 or a disk storage unit 409. As such, the computing system 400 is used as a "special-purpose" machine for implementing the present invention.

The I/O section 402 is connected to a user input module 405 (e.g., the user interface selection device 106, mouse, keyboard, etc.), a display unit 406 and one or more program storage devices, such as, without limitation, the solid state, non-volatile memory device 413, the disk storage unit 409, and the disk drive unit 407. In FIG. 4, the user input module 405 is shown as a keyboard, but as noted above, may also be any other type of apparatus for inputting commands into the processor 401. The solid state, non-volatile memory device 413 is an embedded memory device for storing instructions and commands in a form readable by the CPU 403. In accordance with various embodiments, the solid state, non-volatile memory device 413 may be Read-Only Memory (ROM), an Erasable Programmable ROM (EPROM), Electrically-Erasable Programmable ROM (EEPROM), a Flash Memory or a Programmable ROM, or any other form of solid state, non-volatile memory. In accordance with one embodiment, the disk drive unit 407 is a CD-ROM driver unit capable of reading the CD-ROM medium 408, which typically contains programs 410 and data. Computer program products containing mechanisms to effectuate the systems and methods in accordance with the present invention may reside in the memory section 404, the solid state, non-volatile memory device 413, the disk storage unit 409 or the CD-ROM medium 408.

In accordance with an alternative embodiment, the disk drive unit 407 may be replaced or supplemented by a floppy drive unit, a tape drive unit, or other storage medium drive unit. A network adapter 411 is capable of connecting the computing system 400 to a network of remote computers via a network link 412. Examples of such systems include SPARC systems offered by Sun Microsystems, Inc., personal computers offered by IBM Corporation and by other manufacturers of IBM-compatible personal computers, and other systems running a UNIX-based or other operating system. A remote computer may be a desktop computer, a server, a router, a network PC (personal computer), a peer device or other common network node, and typically includes many or all of the elements described above relative to the computing system 400. Logical connections may include a local area network (LAN) or a wide area network (WAN). Such networking environments are commonplace in offices, enterprise-wide computer networks, intranets, and the Internet.

In accordance with a program product embodiment of the present invention, software instructions stored on the solid state, non-volatile memory device 413, the disk storage unit 409, or the CD-ROM 408 are executed by the CPU 403. In this embodiment, these instructions may be directed toward any one or more of the following tasks: communicating data between a client and a server, monitoring (e.g., collecting data from) the weight measuring devices 114 and 116, monitoring (e.g., collecting data from) the flow meter 112, monitoring or controlling operation of any one of the concentrate pumps (124 and 126), the component valves (120 and 122) and the water control valve 118, analyzing data and generating reports. Data is stored in the memory section 404, or on the solid state, non-volatile memory device 413, the disk storage unit 409, the disk drive unit 407 or other storage medium units coupled to the system 400.

In accordance with one embodiment, the computing system 400 further comprises an operating system and usually one or more application programs. Such an embodiment is familiar to those of ordinary skill in the art. The operating system comprises a set of programs that control operations of the computing system 400 and allocation of resources. The set of programs, inclusive of certain utility programs, also provide a graphical user interface to the user. An application program is software that runs on top of the operating system software and uses computer resources made available through the operating system to perform application specific tasks desired by the user. In accordance with an embodiment, the operating system employs a graphical user interface, wherein the display output of an application program is presented through the graphical user interface on the display 104. The operating system is operable to multitask, i.e., execute computing tasks in multiple threads, and thus may be any of the following: Microsoft Corporation's "WINDOWS 95," "WINDOWS CE," "WINDOWS 98," "WINDOWS 2000" or "WINDOWS NT" operating systems, IBM's OS/2 WARP, Apple's MACINTOSH OSX operating system, Linux, UNIX, etc.

In accordance with the practices of persons skilled in the art of computer programming, the present invention is described below with reference to acts and symbolic representations of operations that are performed by the computing system 400, i.e., the controller 102 or a remote computer communicatively coupled thereto, unless indicated otherwise. Such acts and operations are sometimes referred to as being computer-executed. It will be appreciated that the acts and symbolically represented operations include the manipulations by the CPU 403 of electrical signals representing data bits causing a transformation or reduction of the electrical signal representation, and the maintenance of data bits at memory locations in the memory 404, the solid state, non-volatile memory device 413, the configured CD-ROM 408 or the storage unit 409 to thereby reconfigure or otherwise alter the operation of the computing system 400, as well as other processing signals. The memory locations where data bits are maintained are physical locations that have particular electrical, magnetic, or optical properties corresponding to the data bits.

The logical operations of the various embodiments of the present invention are implemented either manually and/or (1) as a sequence of computer-implemented steps running on a computing system, e.g., control box 112, and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, acts, steps or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 5:
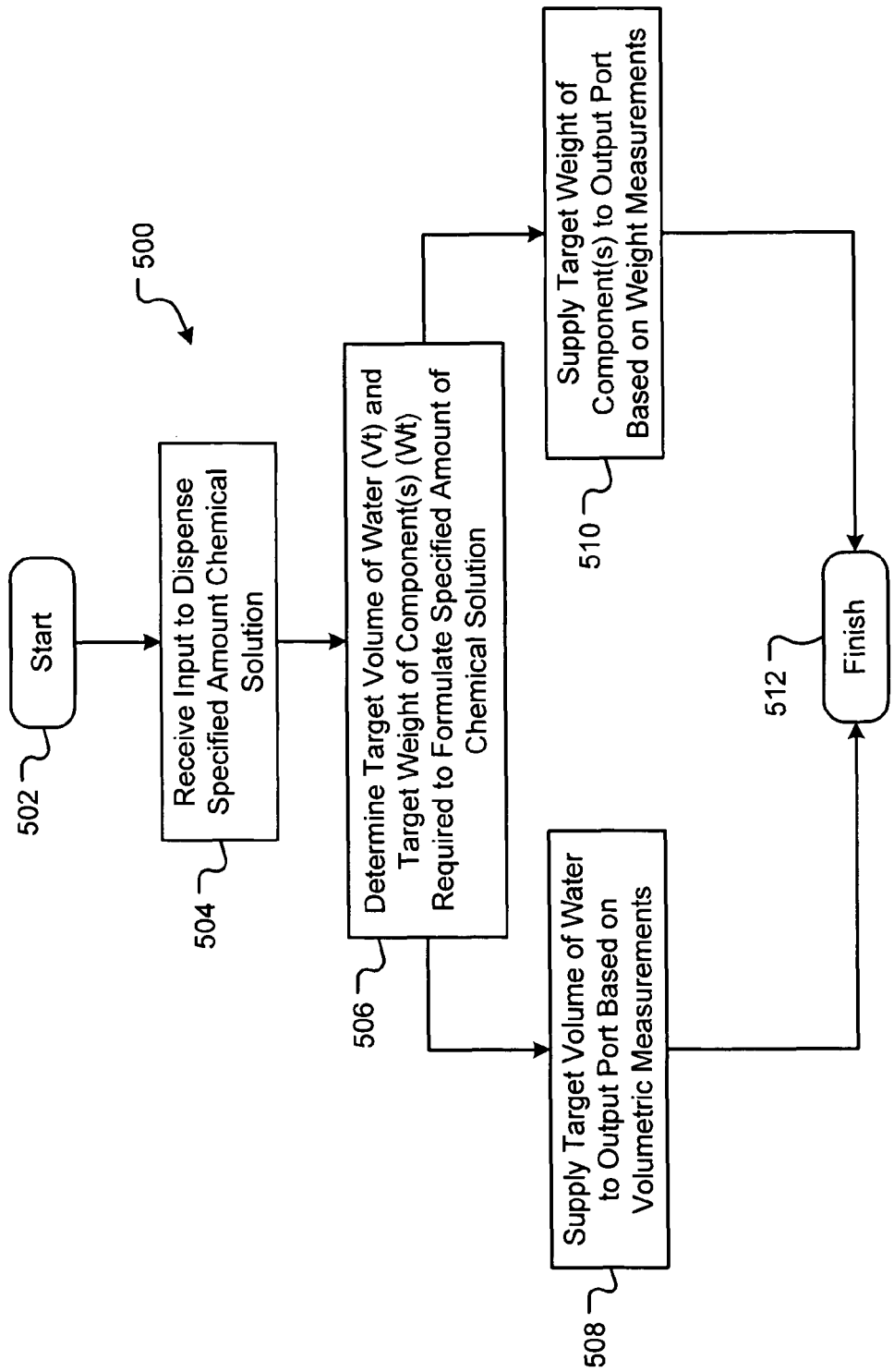
FIG. 5 is a flow diagram that illustrates operational characteristics embodying a process for formulating a chemical solution in accordance with an embodiment of the present invention, the chemical solution being formulated by combining component water with at least one component concentrate and the process thus including a water supply operation for supplying the component and a concentrate supply operation for supplying the component concentrate for use in formulating the chemical solution.

With the computing environment in mind, FIG. 5 illustrates operational characteristics of a process 500 for formulating (hereinafter, "formulation process") chemical solutions in accordance with embodiments of the present invention. The formulation process 500 shown in FIG. 5 is described as being practiced using components embodied in the batch processing formulation system 100 and the proportional processing formulation system 200 in accordance with an exemplary embodiment of the present invention. In this regard, both of the systems (100 and 200) described in FIGS. 1 and 2 are operable to practice the formulation process 500, and thus, the logical operations of the formulation process 500 are described herein as being performed by the controller 102.

In an embodiment, the formulation process 500 is performed using an operation flow beginning with a start operation 502 and ending with a terminate operation 512. The start operation 502 is initiated in response to a user's request to use the formulation process 500 to formulate a chemical solution. In response to such a request, the operation flow passes to a receive operation 504. The receive operation 504 receives information from the user regarding the amount and type of chemical solution that the user would like to formulate. In an embodiment, this information is entered into the controller 102 by the user through the interface selection device 106 as the user interacts with the graphical user interface presented in the display 104. After the controller 102 has received instructions as to a specific amount and type of chemical solution requested for formulation, the operation flow passes to a determination operation 506.

The determination operation 506 determines the components appropriate for formulating the chemical solution. For illustrative purposes, the appropriate components include water and two component concentrates. The determination operation 506 further determines the appropriate volume of water (hereinafter, "target volume," or "$V_t$") and weights (hereinafter, individually referred to as "target weight," or "$W_t$") for the component concentrates required to formulate the requested amount of the specified chemical solution. To accomplish this, the controller 102 is programmed with data that prescribes the necessary volume of water and weights of specific component concentrates for each of a predetermined plurality of chemical solutions as well as specific amounts thereof. Alternatively, the controller 102 may only be programmed to formulate a single chemical solution using predetermined components, and thus, the determination 506 is not required to determine the appropriate components, but rather only the target volume ($V_t$) and/or target weights ($W_t$) of these predetermined components. Regardless of the implementation, the operation flow of the formulation process 500 splits into two portions after the determination operation 506, with one portion proceeding to a supply water operation 508 and the other portion proceeding to a supply concentrate operation 510.

The supply water operation 508 supplies the target volume ($V_t$) of water to the output port 115 and the supply concentrate operation 510 supplies the target weight ($W_t$) of each component concentrate to the output port 115. As described in connection with FIG. 1, the water and component concentrates are thereafter dispensed from the output port 115 to the solution storage container 117 for formulation of the specified amount of the requested chemical solution therein. As such, the formulated chemical solution in the solution storage container is referred to as "ready to use."

The supply water operation 508 enables the supply of water to the output port 115 and monitors the flow of water therethrough to continuously track the actual volume of water dispensed to the output port 115. In response to determining that the actual volume of water meets the target volume ($V_t$), the supply water operation 508 disables the supply of water to the output port 115 and the portion of the operation flow associated with the supply water operation 508 terminates at the terminate operation 512. Operational characteristics of the supply water operation 508 is described in greater detail as a process in connection with FIG. 6 in accordance with an embodiment of the present invention.

The supply concentrate operation 510 enables the supply of the appropriate component concentrates to the output port 115 and monitors weight characteristics of these component concentrates to continuously track the actual weight of each component concentrate supplied to the output port 115. In response to determining that the actual weight of each component concentrate meets an associated target weight ($W_t$), the supply concentrate operation 510 disables the supply of that component concentrate to the output port 115. Finally, after the target weights ($W_t$) of each of the necessary component concentrates have been supplied to the output port, the portion of the operation flow associated with the supply concentrate operation 510 terminates at the terminate operation 512. Operational characteristics of the supply concentrate operation 510 is described in greater detail as a process in connection with FIGS. 7 and 8 in accordance with the alternative embodiments of the present invention shown in FIGS. 1 and 2, respectively.

In an embodiment, the supply water operation 508 and the supply concentrate operation 510 are performed substantially concurrently such that the water and the appropriate component concentrates are provided to the output port 115 in substantially simultaneous fashion. In this regard, the supply concentrate operation 510 may be performed multiple times during the supply water operation 508 if formulation of the requested chemical solution requires more than one component concentrate. Such multiple performance of the supply concentrate operation 510 may be administered in successive or concurrent fashion during the duration of the supply water operation 508.

Figure 6:
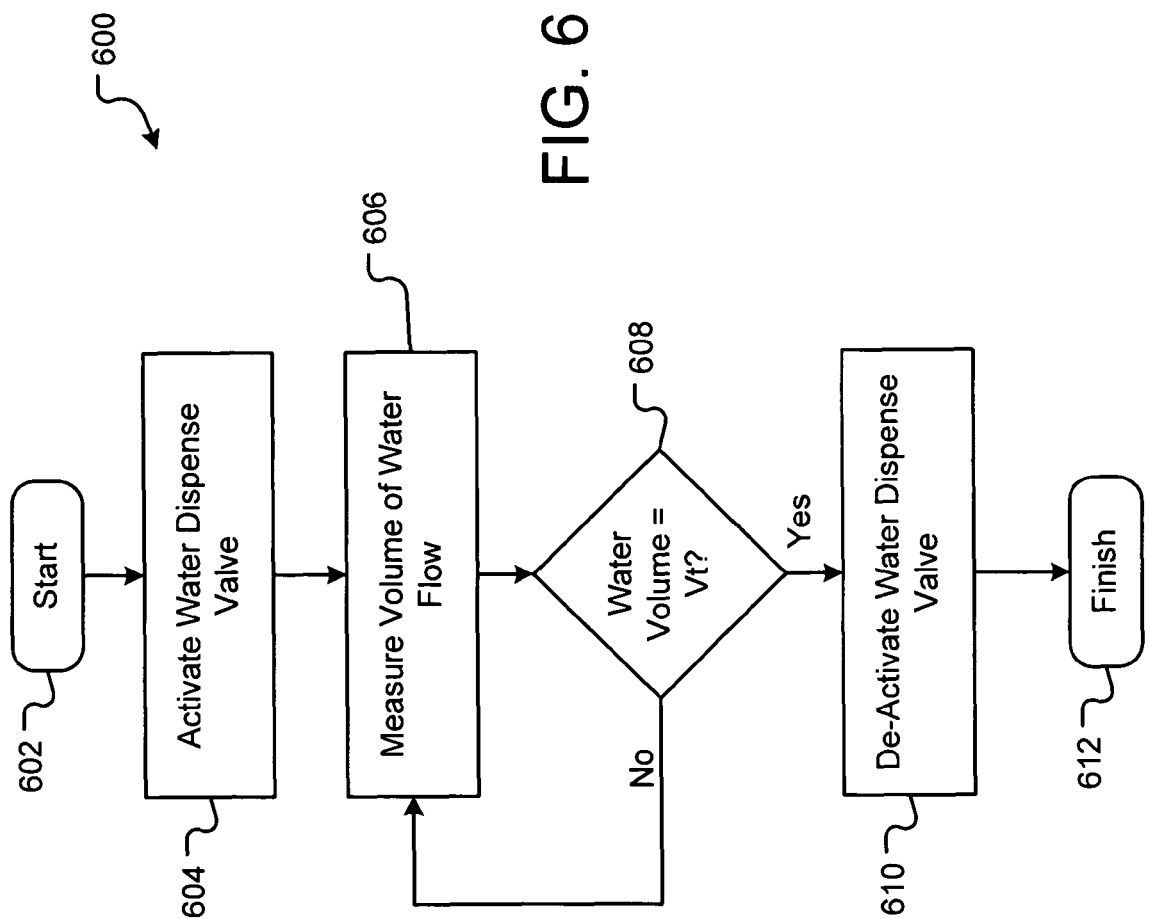
FIG. 6 is a flow diagram that illustrates operational characteristics embodying the water supply operation shown in FIG. 5 in more detail in accordance with an embodiment of the present invention.

Referring now to FIG. 6, the supply water operation 508 of FIG. 5 is shown in greater detail as a process 600 in accordance with an embodiment of the present invention. In this embodiment, the water supply process 600 is practiced by either of the formulation systems 100 and 200 shown in FIGS. 1 and 2, respectively. As such, the logical operations of the water supply process 600, like the formulation process 500, are described herein as being performed by the controller 102.

The water supply process 600 is performed using an operation flow beginning with a start operation 602 and concluding with a terminate operation 612. The start operation 602 is initiated in response to the operation flow of the formulation process 500 passing from the determination operation 506 to the water supply operation 508. From the start operation 602, the operation flow of the water supply process 600 passes to an activate valve operation 604. The activate valve operation 604 activates the water control valve 118 such that water may be supplied from the water source 136 to the output port 115. In an embodiment, the activate valve operation 604 involves the controller 102 issuing an "open valve" instruction (e.g., electrical signal) to the water control valve 118. After the water control valve 118 has been activated, the operation flow passes to a measure operation 606.

The measure operation 606 tracks the actual volume of water flow between the water source 136 and the output port 115 since the activation of the water control valve 118. As such, the measure operation 606 involves the controller 102 receiving data from the flow meter 112 and analyzing that data to determine the actual volume. Alternatively, the information received by the flow meter 112 may represent the actual volume, in which case, the controller 102 accepts this information for analysis against the target volume ($V_t$), as described in the following paragraph. From the measure operation 606, the operation flow passes to a volume query operation 608.

The volume query operation 608 compares the actual volume of water that has passed between the water control valve 118 and the output port 115 against the target volume ($V_t$) to determine whether the actual volume equals the target volume ($V_t$). If so, the operation flow passes to a de-activate operation 610. If not, the operation flow returns to the measure operation 606 and the operation flow continues passing between the volume query operation 608 and the measure operation 606 until this condition is satisfied, at which time, the operation flow passes to the de-activate operation 610.

The de-activate operation 610 de-activates the water control valve 118, thereby disabling the flow of water between the water source 136 and the output port 115. From the de-activate operation 610, the operation flow concludes at the terminate operation 612. Thus, the operation flow of the formulation operation 500 so terminates at the terminate operation 512.

Figure 7:
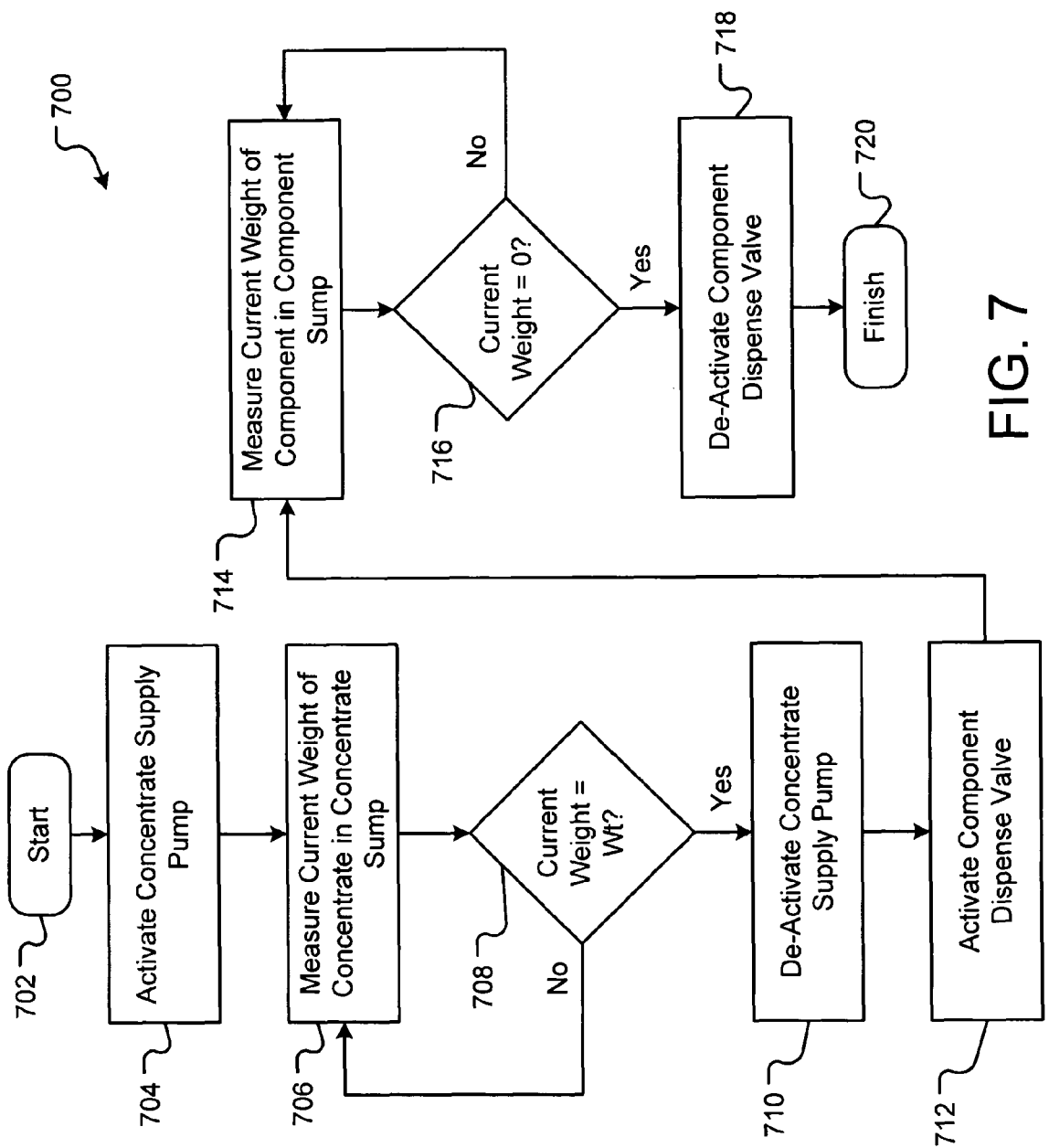
FIG. 7 is a flow diagram that illustrates operational characteristics embodying the concentrate supply operation shown in FIG. 5 in more detail in accordance with an embodiment of the present invention depicted in FIG. 1.

Referring now to FIG. 7, the concentrate supply operation 510 of FIG. 5 is shown in greater detail as a process 700 in accordance with an embodiment of the present invention. In this embodiment, the concentrate supply process 700 is practiced by the formulation system 100 shown in FIG. 1. As such, the logical operations of the concentrate supply process 700, like the formulation process 500, are described herein as being performed by the controller 102. For illustrative purposes, the concentrate supply process 700 is described as supplying only a single component chemical concentrate, and more particularly, the component concentrate contained in the first concentrate storage container 132, to the formulation process 500. However, it should be appreciated that the concentrate supply process 700 may be practiced multiple times either in substantially successive or concurrent fashion to supply multiple component concentrates to the formulation process 500.

The start operation 702 is initiated in response to the operation flow of the formulation process 500 passing from the determination operation 506 to the concentrate supply operation 510. From the start operation 702, the operation flow of the concentrate supply process 700 passes to an activate pump operation 704. The activate pump operation 704 activates the first concentrate pump 124 such that component concentrate is pumped from the first concentrate storage container 132 to the first component sump 128. In an embodiment, the activate pump operation 704 involves the controller 102 issuing an "on" instruction (e.g., electrical signal) to the first concentrate pump 124. After the first concentrate pump 124 has been activated, the operation flow passes to a first measure operation 706.

The first measure operation 706 tracks the actual weight of the component concentrate pumped into the first component sump 128 from the first concentrate storage container 132 since the activation of the first concentrate pump 124. As such, the first measure operation 706 involves the controller 102 receiving data from the weight measuring device 114 and analyzing that data to determine the actual weight. Alternatively, the information received by the weight measuring device 114 may represent the actual weight, in which case, the controller 102 accepts this information for analysis against the target weight ($W_t$) for the component concentrate, as described in the following paragraph. From the first measure operation 706, the operation flow passes to a first query operation 708.

The first query operation 708 compares the actual weight of the component concentrate residing in the first component sump 128 against the target weight ($W_t$) to determine whether the actual weight substantially equals the target weight ($W_t$). If so, the operation flow passes to a de-activate pump operation 710. If not, the operation flow returns to the measure operation 706 and the operation flow continues passing between the first weight query operation 708 and the first measure operation 706 until this condition is satisfied, at which time, the operation flow passes to the de-activate pump operation 710.

The de-activate pump operation 710 de-activates the first concentrate pump 124, thereby disabling the flow of the component concentrate between the first concentrate storage tank 132 and the first component sump 128. From the de-activate pump operation 710, the operation flow passes to an activate valve operation 712.

The activate valve operation 712 activates the first component control valve 120 such that the component concentrate stored in the first component sump 128 can be supplied to the output port 115. In an embodiment, the activate valve operation 712 involves the controller 102 issuing an "open valve" instruction (e.g., electrical signal) to the first component control valve 120. After the first component control valve 120 has been activated, the operation flow passes to a second measure operation 714.

The second measure operation 714 tracks the amount of the component concentrate dispensed from the first component sump 128 since the activation of the first component control valve 120. As such, the second measure operation 714 involves the controller 102 receiving data from the first weight measuring device 114 and analyzing that data to determine the current weight of the component concentrate residing in the first component sump 128. Alternatively, the information received by the weight measuring device 114 may represent the current weight, in which case, the controller 102 accepts this information for analysis against a minimum prescribed weight (e.g., 0 grams), as described in the following paragraph. From the second measure operation 714, the operation flow passes to a second query operation 716.

The second query operation 716 compares the current weight of the component concentrate remaining in the first component sump 128 against the minimum prescribed weight to determine whether all of the component concentrate contained therein has been dispensed to the output port 115. If so, the operation flow passes to a de-activate valve operation 718. If not, the operation flow returns to the second measure operation 714 and the operation flow continues passing between the second query operation 716 and the second measure operation 716 until this condition is satisfied, at which time, the operation flow passes to the de-activate valve operation 718.

The de-activate valve operation 718 de-activates the first component control valve 120, thereby forbidding the flow of any future component concentrates supplied to the first component sump 128 to flow to the output port 115 without first activating the first component control valve 120. From the de-activate valve operation 718, the operation flow of the component supply process 700 concludes at the terminate operation 720. Thus, the operation flow of the formulation operation 500 so terminates at the terminate operation 512.

Referring now to FIG. 8, the concentrate supply operation 510 of FIG. 5 is shown in greater detail as a process 800 in accordance with another embodiment of the present invention. In this embodiment, the concentrate supply process 800 is practiced by the formulation system 200 shown in FIG. 2. As such, the logical operations of the concentrate supply process 800, like the formulation process 500, are described herein as being performed by the controller 102. For illustrative purposes, the concentrate supply process 800 is described as supplying only a single component chemical concentrate, and more particularly, the component concentrate contained in the first concentrate storage container 132, to the formulation process 500. However, it should be appreciated that the concentrate supply process 800 may be practiced multiple times either in substantially successive or concurrent fashion to supply multiple component concentrates to the formulation process 500.

The start operation 802 is initiated in response to the operation flow of the formulation process 500 passing from the determination operation 506 to the concentrate supply operation 510. From the start operation 802, the operation flow of the concentrate supply process 800 passes to an initial weight measure operation 804. The initial weight measure operation 804 measures the weight of the component concentrate stored in the first concentrate storage container 132. From the initial weight measure operation 804, the operation flow passes to an activate valve operation 806.

The activate valve operation 806 activates the first component control valve 120 such that the component concentrate stored in the first concentrate container 132 can be supplied to the output port 115. In an embodiment, the activate valve operation 806 involves the controller 102 issuing an "open valve" instruction (e.g., electrical signal) to the first component control valve 120. After the first component control valve 120 has been activated, the operation flow passes to a current weight measure operation 808.

The current weight measure operation 808 tracks the weight of the component concentrate remaining in the first concentrate container 132 since the activation of the first component control valve 120. As such, the current weight measure operation 808 involves the controller 102 receiving data from the first weight measuring device 114 and analyzing that data to determine the current weight of the component concentrate residing in the first concentrate container 132. Alternatively, the information received by the weight measuring device 114 may actually represent the current weight, in which case, the controller 102 accepts this information for analysis to determine whether the target weight ($W_t$) has been dispensed from the first concentrate container 132, as described in the following paragraph. From the current weight measure operation 808, the operation flow passes to a query operation 810.

The query operation 810 compares the difference between the initial weight measured by the initial weight measure operation 804 and the current weight measured by the current weight measure operation 808 to the target weight ($W_t$). If so, the operation flow passes to a de-activate valve operation 812. If not, the operation flow returns to the current weight measure operation 808 and the operation flow continues passing between the query operation 810 and the current weight measure operation 808 until this condition is satisfied, at which time, the operation flow passes to the de-activate valve operation 812.

The de-activate valve operation 812 de-activates the first component control valve 120, thereby disabling the flow of the component concentrate between the first concentrate storage container 132 and the output port 115. From the de-activate valve operation 812, the operation flow of the component supply process 800 concludes at the terminate operation 814. Thus, the operation flow of the formulation operation 500 so terminates at the terminate operation 512.

It will be clear that the present invention is well adapted to attain the ends and advantages mentioned, as well as those inherent therein. While a presently preferred embodiment has been described for purposes of this disclosure, various changes and modifications may be made which are well within the scope of the present invention. For example, while the operational characteristics of the formulation process 500 and the various embodiments of the sub-processes of the formulation process 500 shown in FIGS. 5-8 are described above as being practiced by the formulation systems 100 and 200, it should be appreciated that other embodiments contemplated within the scope of the present invention involve systems other than these two systems (100 and 200) being utilized to practice the formulation process 500.

Additionally, the formulation systems 100 and 200 shown in FIGS. 1 and 2, respectively, utilize a component sump (e.g., 128 and 130) for each different concentrate container (e.g., 132 and 134) being used to formulate a chemical product in response to instruction from the controller 102. Such an implementation is advantageous if premature reaction between two or more component concentrates for the chemical product yields adverse effects, such as, an unstable chemical solution, unpleasant or toxic odor, etc. However, an embodiment of the present invention contemplates replacing the multiple sump-weight measuring device implementation with a single sump (e.g., 128 and 130) and a single associated weight measuring device (e.g., 114 and 116). In this embodiment, all component concentrates being used to formulate the chemical solution are pumped either concurrently or sequentially from respective concentrate storage containers 132 and 134 to the single sump (e.g., 114 and 116).

Additionally, in an embodiment wherein determination (by the determination operation 506) of the appropriate component concentrates for using in formulating a specific chemical solution is dynamic, i.e., the controller 102 is programmed with data that prescribes the necessary volume of water and weights of specific component concentrates for each of a predetermined plurality of chemical solutions, the supply concentrate operation 510 selects the concentrate storage container (e.g., 132 and 134) that contain the appropriate component concentrates prior to any further action.

Even further, the controller 102 may be programmed to analyze the information received from the "monitoring" modules against information regarding the current operational state of the various "controllable" modules to perform diagnostics testing and provide alarm features for the formulation systems 100 and 200. For example, if a diagnostic test yields the weight measured at one of the component sumps (e.g., 128 or 130) being zero and the same time that the associated concentrate pump (e.g., 124 or 126) is active, the controller 102 detects that the corresponding concentrate container is depleted and may issue an alarm to a responsible service person or vendor. As noted above, the controller 102 may be communicatively coupled to a remote computer by way of a communications network, and thus, this alarm may be presented to the responsible service person electronically.

Finally, while the various embodiments of the present invention described herein apply generally to any type of chemical solution being formulated for any purpose, an exemplary use for the formulation systems 100 and 200 pertains to the endoscope reprocessing field. In this regard, an exemplary chemical composition includes an antimicrobial agent, such as a peroxycarboxylic acid, e.g., peroxyacetic acid. Such a composition can be formulated by combining water with, for example, component concentrates such as a peroxyacetic acid concentrate and an adjuvant concentrate.

Peroxycarboxylic Acid Antimicrobial Composition

Compositions of Carboxylic Acids and Peroxycarboxylic Acids

Among other constituents, the present antimicrobial composition includes a carboxylic acid. Generally, carboxylic acids have the formula R—COOH wherein the R can represent any number of different groups including aliphatic groups, alicyclic groups, aromatic groups, heterocyclic groups, all of which can be saturated or unsaturated as well as substituted or unsubstituted. Carboxylic acids can have one, two, three, or more carboxyl groups. The present the invention can employ carboxylic acids containing as many as 18 carbon atoms. Examples of suitable carboxylic acids include formic, acetic, propionic, butanoic, pentanoic, hexanoic, heptanoic, octanoic, nonanoic, decanoic, undecanoic, dodecanoic, lactic, maleic, ascorbic, citric, hydroxyacetic, neopentanoic, neoheptanoic, neodecanoic, oxalic, malonic, succinic, glutaric, adipic, pimelic and suberic acid. Carboxylic acids which are generally useful include those having one or two carboxyl groups where the R group is a primary alkyl chain having a length of $C_2$ to $C_{12}$. The primary alkyl chain is that carbon chain of the molecule having the greatest length of carbon atoms and directly appending carboxyl functional groups.

Peroxycarboxylic (or percarboxylic) acids generally have the formula $R(CO_3H)_n$, where R is an alkyl, arylalkyl, cycloalkyl, aromatic or heterocyclic group, and n is one, two, or three, and named by prefixing the parent acid with peroxy. While peroxycarboxylic acids are not as stable as carboxylic acids, their stability generally increases with increasing molecular weight. Thermal decomposition of these acids can generally proceed by free radical and nonradical paths, by photodecomposition or radical-induced decomposition, or by the action of metal ions or complexes. Percarboxylic acids can be made by the direct, acid catalyzed equilibrium action of hydrogen peroxide with the carboxylic acid, by autoxidation of aldehydes, or from acid chlorides, and hydrides, or carboxylic anhydrides with hydrogen or sodium peroxide.

Peroxycarboxylic acids useful in the compositions and methods of the present invention include peroxyformic, peroxyacetic, peroxypropionic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxymaleic, peroxyascorbic, peroxyhydroxyacetic, peroxyoxalic, peroxymalonic, peroxysuccinic, peroxyglutaric, peroxyadipic, peroxypimelic, and peroxysuberic acid, and mixtures thereof. Peroxy forms of carboxylic acids with more than one carboxylate moiety can have one or more of the carboxyl moieties present as peroxycarboxyl moieties. These peroxycarboxylic acids have been found to provide good antimicrobial action with good stability in aqueous mixtures. In an embodiment, the present composition includes a chelating agent.

In an embodiment, the present antimicrobial composition includes one or more small $C_2$-$C_4$ peroxycarboxylic acids, e.g., peroxyacetic acid. Peroxyacetic (or peracetic) acid is a peroxycarboxylic acid having the formula: $CH_3COOOH$. Generally, peroxyacetic acid is a liquid having an acrid odor at higher concentrations and is freely soluble in water, alcohol, ether, and sulfuric acid. Peroxyacetic acid can be prepared through any number of known methods including, for example, preparation from acetaldehyde and oxygen in the presence of cobalt acetate. A solution of peroxyacetic acid can be obtained by combining acetic acid with hydrogen peroxide. A 50% solution of peroxyacetic acid can be obtained by combining acetic anhydride, hydrogen peroxide and sulfuric acid. Other methods of formulation of peroxyacetic acid include those disclosed in U.S. Pat. No. 2,833,813, which is incorporated herein by reference.

In an embodiment, the present antimicrobial composition includes peroxyoctanoic acid, peroxynonanoic acid, or peroxyheptanoic acid, e.g., peroxyoctanoic acid. Peroxyoctanoic (or peroctanoic) acid is a peroxycarboxylic acid having the formula, for example, of n-peroxyoctanoic acid: $CH_3(CH_2)_6COOOH$. Peroxyoctanoic acid can be an acid with a straight chain alkyl moiety, an acid with a branched alkyl moiety, or a mixture thereof. Peroxyoctanoic acid can be prepared through any number of known methods. A solution of peroxyoctanoic acid can be obtained by combining octanoic acid and hydrogen peroxide.

The present compositions include concentrate compositions and use compositions. An antimicrobial concentrate composition can be diluted, for example with water, to form an antimicrobial use composition. In an embodiment, the concentrate composition is diluted into water employed for washing or processing an endoscope.

An antimicrobial concentrate composition can include, for example, about 30 to about 60 weight-%, about 35 to about 60 weight-%, about 35 to about 50 weight-%, or about 40 to about 50 weight-% acetic acid; about 2 to about 12 weight-% or about 2 to about 8 weight-% hydrogen peroxide; and about 6 to about 16 weight-% or about 8 to about 16 weight-% peroxyacetic acid. This concentrate composition can also include about 0.1 to about 2 weight-% chelating agent. An antimicrobial use composition can include, for example, about 5 to about 5000 ppm, about 500 to about 4,000 ppm, or about 1,000 to about 3000 ppm acetic acid; about 1 to about 200 ppm or about 1 to about 110 ppm hydrogen peroxide; and about 2 to about 300 ppm or about 2 to about 220 ppm peroxyacetic acid. Different dilutions of a concentrate composition can result in different levels of the components of the use composition, generally maintaining the relative proportions. For example, a use present antimicrobial composition can have concentrations twice, one half, or one quarter those listed above.

Suitable peroxycarboxylic acid compositions include those disclosed in U.S. Pat. Nos. 5,200,189, 5,314,687, 5,409,713, 5,437,868, 5,489,434, 6,674,538, 6,010,729, 6,111,963, and 6,514,556, the disclosures of which are incorporated herein by reference.

Hydrogen Peroxide

The present antimicrobial composition can also include a hydrogen peroxide constituent. Hydrogen peroxide in combination with the percarboxylic acid provides certain antimicrobial action against microorganisms. Additionally, hydrogen peroxide can provide an effervescent action which can irrigate any surface to which it is applied. Hydrogen peroxide works with a mechanical flushing action once applied which further cleans the surface of application.

Many oxidizing agents can be used for generating peroxycarboxylic acids. Suitable oxidizing agents, in addition to hydrogen peroxide, include perborate, percarbonate, and persulfate. Hydrogen peroxide is generally suitable for several reasons. For example, after application of the $H_2O_2$/peroxycarboxylic acid germicidal agent, the residue left merely includes water and an acidic constituent.

Hydrogen peroxide ($H_2O_2$), has a molecular weight of 34.014 and it is a weakly acidic, clear, colorless liquid. The four atoms are covalently bonded in a H—O—O—H structure. Generally, hydrogen peroxide has a melting point of −0.41° C., a boiling point of 150.2° C., a density at 25° C. of 1.4425 grams per $cm^3$, and a viscosity of 1.245 centipoise at 20° C.

Carrier

The composition of the invention also includes a carrier. The carrier provides a medium which dissolves, suspends, or carries the other components of the composition. For example, the carrier can provide a medium for solubilization and production of peroxycarboxylic acid and for forming an equilibrium mixture. The carrier also functions to deliver and wet the antimicrobial composition of the invention to the endoscope. To this end, the carrier may contain any component or components that can facilitate these functions.

Generally, the carrier includes primarily water which is an excellent solubilizer and medium for reaction and equilibrium. The carrier can include or be primarily an organic solvent, such as simple alkyl alcohols, e.g., ethanol, isopropanol, n-propanol, and the like. Polyols are also useful carriers, including propylene glycol, polyethyleneglycol, glycerol, sorbitol, and the like. Any of these compounds may be used singly or in combination with other organic or inorganic constituents or, in combination with water or in mixtures thereof.

Generally, the carrier makes up a large portion of the composition and may be the balance of the composition apart from the active antimicrobial components, adjuvants, and the like. Here again, the carrier concentration and type will depend upon the nature of the composition as a whole, the environmental storage, and method of application including concentration of the antimicrobial agent, among other factors. Notably the carrier should be chosen and used at a concentration which does not inhibit the antimicrobial efficacy of the active agent in the composition.

Adjuvants

The antimicrobial composition can also include any number of adjuvants. Specifically, the composition can include stabilizing agent, wetting agent, hydrotrope, thickener, surfactant, foaming agent, acidifier, as well as pigments or dyes among any number of constituents which can be added to the composition. Such adjuvants can be preformulated with the antimicrobial composition or added to the system simultaneously, or even after, the addition of the antimicrobial composition. The composition can also contain any number of other known constituents as necessitated by the application.

Stabilizing Agents

Stabilizing agents can be added to the composition, for example, to stabilize the peracid and hydrogen peroxide and prevent the premature oxidation of this constituent within the composition.

Chelating agents or sequestrants generally useful as stabilizing agents in the present compositions include alkyl diamine polyacetic acid-type chelating agents such as EDTA (ethylene diamine tetraacetate tetrasodium salt), acrylic and polyacrylic acid-type stabilizing agents, phosphonic acid, and phosphonate-type chelating agents among others. Suitable sequestrants include phosphonic acids and phosphonate salts including 1-hydroxy ethyldene-1,1-diphosphonic acid ($CH_3C(PO_3H_2)_2OH$) (HEDP), amino[tri(methylene phosphonic acid)] ($[CH_2PO_3H_2]_2$(ethylene diamine[tetra methylene-phosphonic acid)], 2-phosphene butane-1,2,4-tricarboxylic acid, as well as the alkyl metal salts, ammonium salts, or alkyloyl amine salts, such as mono, di, or tetra-ethanolamine salts. The stabilizing agent can be used at a concentration of about 0 wt-% to about 20 wt-% of the composition, about 0.1 wt-% to about 10 wt-% of the composition, or about 0.2 wt-% to 5 wt-% of the composition.

Amino phosphates and phosphonates are also suitable for use as chelating agents in the compositions and include ethylene diamine (tetramethylene phosphonates), nitrilotrismethylene phosphates, diethylenetriamine (pentamethylene phosphonates). These amino phosphonates commonly contain alkyl or alkaline groups with less than 8 carbon atoms. The phosphonic acid may also include a low molecular weight phosphonopolycarboxylic acid such as one having about 2-4 carboxylic acid moieties and about 1-3 phosphonic acid groups. Such acids include 1-phosphono-1-methylsuccinic acid, phosphonosuccinic acid and 2-phosphonobutane-1,2,4-tricarboxylic acid.

Suitable commercially available chelating agents include phosphonates sold under the trade name DEQUEST® including, for example, 1-hydroxyethylidene-1,1-diphosphonic acid, available from Monsanto Industrial Chemicals Co., St. Louis, Mo., as DEQUEST® 2010; amino(tri(methylenephosphonic acid)), ($N[CH_2PO_3H_2]_3$), available from Monsanto as DEQUEST® 2000; ethylenediamine[tetra(methylenephosphonic acid)] available from Monsanto as DEQUEST® 2041; and 2-phosphonobutane-1,2,4-tricarboxylic acid available from Mobay Chemical Corporation, Inorganic Chemicals Division, Pittsburgh, Pa., as Bayhibit AM.

The above-mentioned phosphonic acids can also be used in the form of water soluble acid salts, particularly the alkali metal salts, such as sodium or potassium; the ammonium salts or the alkylol amine salts where the alkylol has 2 to 3 carbon atoms, such as mono-, di-, or triethanolamine salts. If desired, mixtures of the individual phosphonic acids or their acid salts can also be used.

The concentration of chelating agent useful in the present composition can be, for example, about 0.01 to about 10 wt-%, about 0.1 to about 5 wt-%, or about 0.5 to about 2 wt-%.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

Numerous other alternative and additive embodiments may be made which will readily suggest themselves to those skilled in the art and which are encompassed in the spirit of the invention disclosed and as defined in the appended claims.

What is claimed is:

1. A system comprising:
   a storage tank that stores at least one component chemical concentrate;
   a controller that receives an instruction requesting formulation of a specified amount of a chemical solution and determines a target volume of water and a target weight of the at least one component chemical concentrate based on the specified amount of the chemical solution;
   an output port that receives water from a water source and the at least one component chemical concentrate from the storage tank and dispenses the water and the at least one component chemical concentrate to a solution container;
   a flow meter that measures volumetric readings representing a volume of the water supplied from the water source to the output port; and
   a weight measuring device that measures weight readings representing an actual weight of the at least one component chemical concentrate contained in the storage tank, wherein the controller further controls supply of the water to the output port based on the volumetric readings and controls supply of the at least one component chemical concentrate to the output port based on the weight readings to form the specified amount of the chemical solution.

2. The system of claim 1 wherein the storage tank is a component sump, the system further comprising:
   a concentrate container that stores the at least one component chemical concentrate prior to storage in the component sump;
   a pump fluidly connected between the component sump and the concentrate container that pumps, under control of the controller, the target weight of the at least one component chemical concentrate from the concentrate container to the component sump; and
   a control valve fluidly connected between the component sump and the output port that enables, under control of the controller, the flow of the at least one component chemical concentrate between the component sump and the output port.

3. The system of claim 2 wherein the weight measuring device measures the weight readings as the at least one component chemical concentrate is pumped from the concentrate container to the component sump and prior to any of the component chemical concentrate being dispensed to the output port by way of the control valve.

4. The system of claim 3 wherein the output port comprises:
   means for evacuating the at least, one component chemical concentrate from the component sump when the control valve is activated by the controller.

5. The system of claim 4 wherein the evacuating means comprises an aspirator.

6. The system of claim 1 wherein the solution container comprises an automatic endoscope reprocessor (AER).

7. The system of claim 1 further comprising:
   a control valve fluidly connected between the storage tank and the output port that enables the flow of the at least one component chemical concentrate from the storage tank to the output port; and
   means for evacuating the at least one component chemical concentrate from the storage tank when the control valve is activated by the controller.

8. The system of claim 7 wherein the weight measuring device measures the weight readings as the at least one component chemical concentrate is evacuated from the storage tank and provided to the output port.

9. The system of claim 1 wherein the controller includes a user interface that receives the instruction requesting formulation of the specified amount of the chemical solution from a user.

10. A method comprising:
    storing at least one component chemical concentrate in a storage tank;
    receiving an instruction from a user requesting formulation of a specified amount of a chemical solution;
    determining a target volume of water and a target weight of the at least one component chemical concentrate appropriate to formulate the specified amount of the chemical solution;
    measuring volumetric readings representing a volume of the water supplied to a solution container;
    measuring weight readings representing an actual weight of the at least one component chemical concentrate remaining in the storage tank while the component chemical concentrate is supplied to the solution container; and
    controlling the supply of the water and the supply of the at least one component chemical concentrate to the solution container based on the volumetric readings and the weight readings to formulate the specified amount of the chemical solution.

11. The method of claim 10 further comprising:
determining whether the target weight of the at least one component chemical concentrate has been supplied to the solution container;
determining whether the target volume of the water has been supplied to the solution container;
deactivating a water dispense valve when the target volume of water has been supplied; and
deactivating a concentrate supply valve when the target weight of the component chemical concentrate has been supplied.

12. The method of claim 10 wherein storing the at least one component chemical concentrate in a storage tank comprises:
transporting the at least one component chemical concentrate to the storage tank from a concentrate container;
prior to supplying water and the at least one component chemical concentrate to the solution container, measuring weight readings representing an actual weight of the at least one component chemical concentrate in the storage tank while the component chemical concentrate is transported from the concentrate container; and
stopping transportation of the at least one component chemical concentrate to the storage tank from the concentrate container if the actual weight of the at least one component chemical concentrate in the storage tank meets the target weight of the at least one component chemical concentrate appropriate for formulating the specified amount of the chemical solution.

13. The method of claim 10 further comprising communicating the weight readings and the volumetric readings to a remote computer over a network connection for analysis.

14. A system comprising:
a concentrate container that stores at least one component chemical concentrate;
a solution storage container that receives the at least one component chemical concentrate and water;
a controller, communicatively coupled to a weight measuring device, a flow meter, a first control valve, a second control valve, and a user interface selection device, that receives an instruction via the user interface selection device requesting formulation of a specified amount of a chemical solution and determines a target volume of water and a target weight of the at least one component chemical concentrate to be dispensed into the solution storage container based on the specified amount of the chemical solution;
a component sump connected to the weight measuring device, wherein the weight measuring device measures, as the at least one component chemical concentrate is pumped into the component sump, an actual weight of the at least one component chemical concentrate contained in the component sump;
a pump fluidly connected between the concentrate container and the component sump that pumps the at least one component chemical concentrate from the concentrate container into the component sump;
wherein the controller further receives the measured actual weight and controls the pump such that the target weight of the at least one component chemical concentrate is pumped into the component sump;
wherein the flow meter is fluidly connected to the first control valve, and the flow meter measures a volume of water supplied from the first control valve to the solution storage container,
wherein the controller further receives the measured volume of water and controls the first control valve such that the target volume of water is supplied to the solution storage container,
wherein the second control valve fluidly connected between the component sump and the solution storage container enables flow of the at least one component chemical concentrate from the component sump to the solution storage container, and
wherein the controller further controls the second control valve such that the target weight of the at least one component chemical concentrate flows from the component sump to the solution storage container.

* * * * *